Nov. 12, 1968         C. H. VORPAHL         3,409,990
WHEEL ALIGNMENT APPARATUS
Filed Dec. 1, 1965                                   4 Sheets-Sheet 1
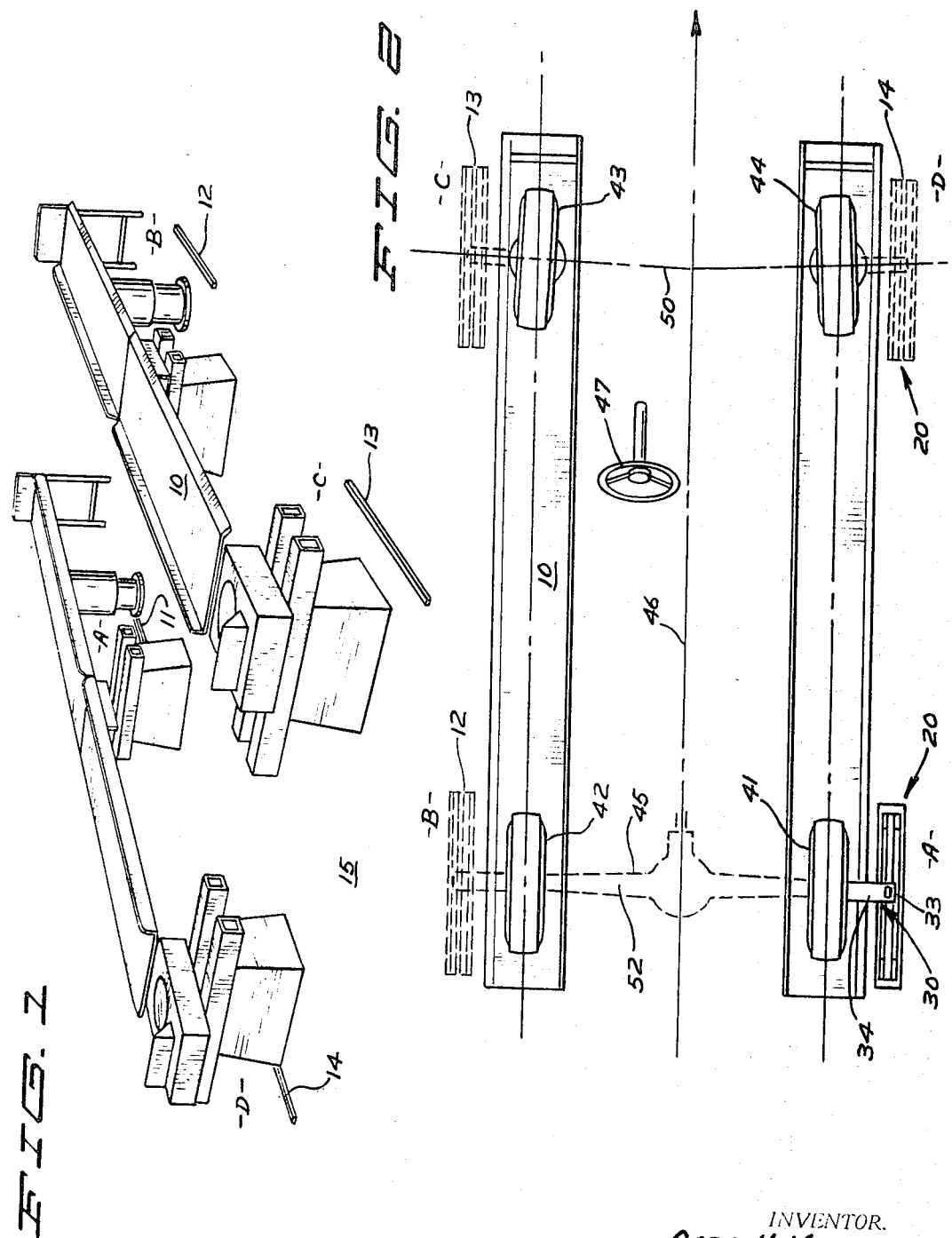
INVENTOR.
CARL H. VORPAHL
BY
Carlsen, Carlsen + Sturm
ATTORNEYS

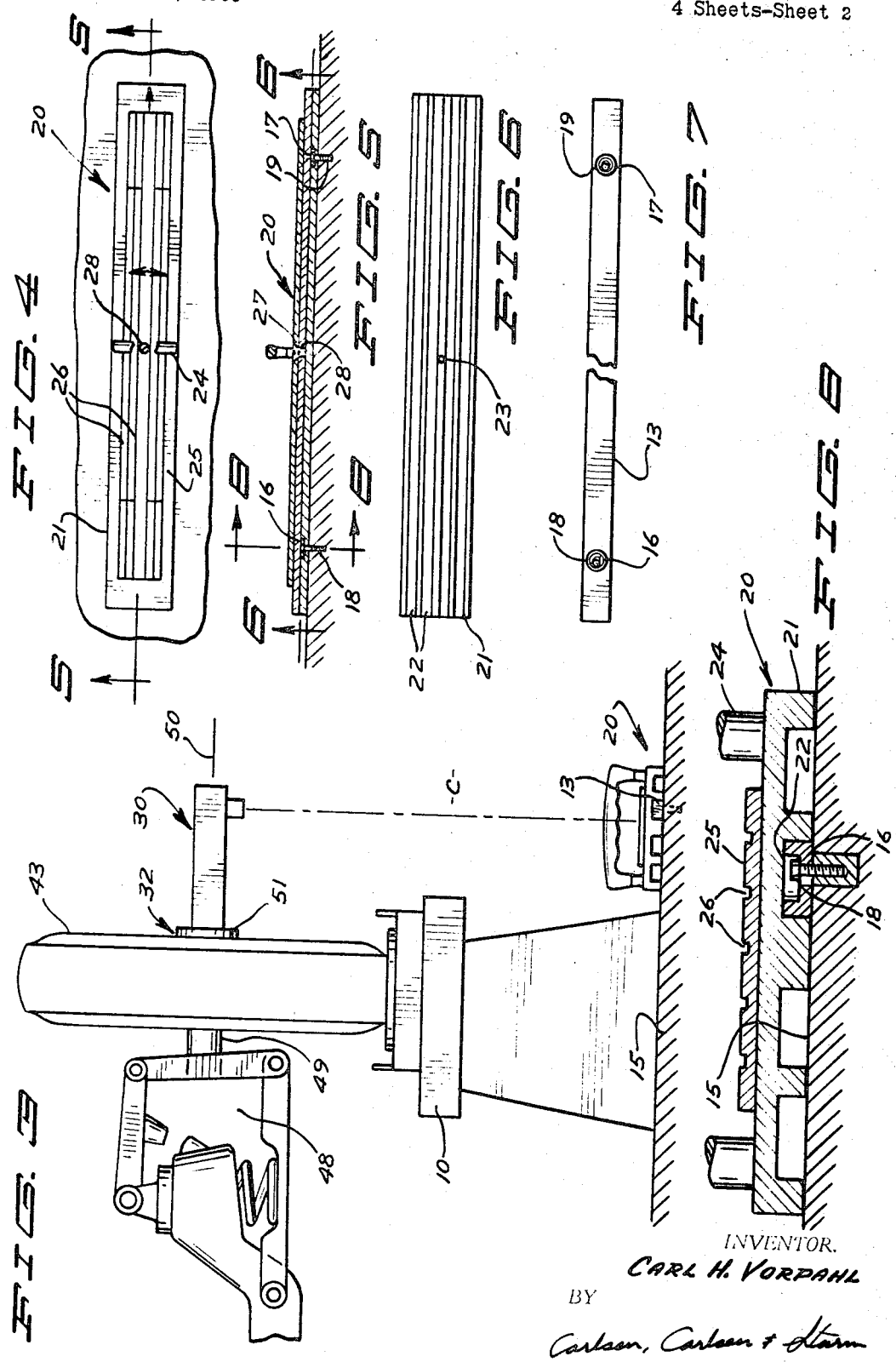

Nov. 12, 1968
C. H. VORPAHL
3,409,990
WHEEL ALIGNMENT APPARATUS
Filed Dec. 1, 1965
4 Sheets-Sheet 3
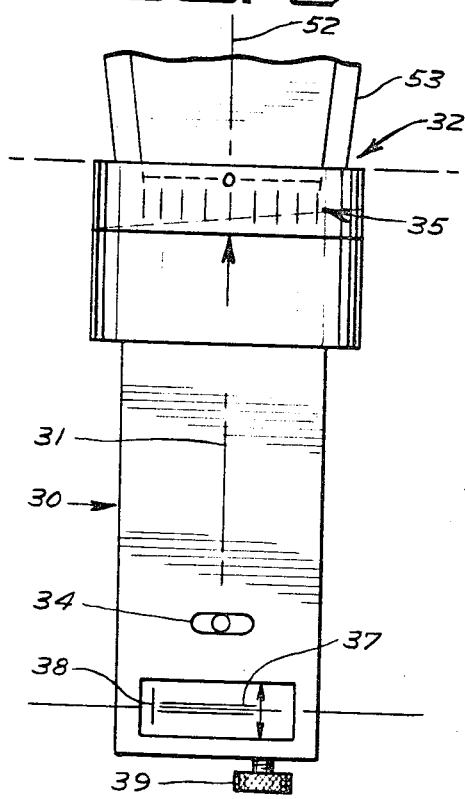
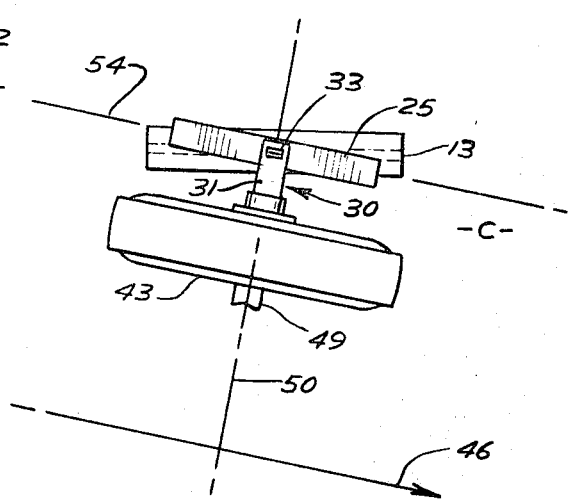
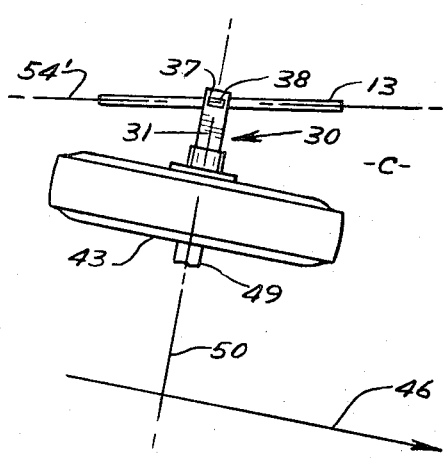
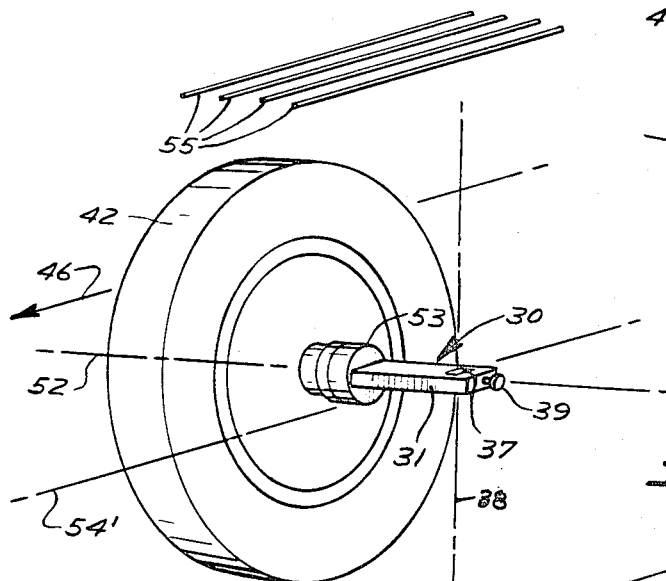
INVENTORS
CARL H. VORPAHL
BY
Carlsen, Carlsen & Sturm
ATTORNEYS

United States Patent Office 3,409,990
Patented Nov. 12, 1968

3,409,990
WHEEL ALIGNMENT APPARATUS
Carl H. Vorpahl, Minnetonka, Minn., assignor to Bishman Manufacturing Company, Osseo, Minn., a corporation of Minnesota
Filed Dec. 1, 1965, Ser. No. 528,007
9 Claims. (Cl. 33—203.12)

ABSTRACT OF THE DISCLOSURE

A wheel alignment system incorporating a vehicle support having work stations located to be adjacent to the wheels of a vehicle when disposed on the support. Each work station is provided with a longitudinally extending reference marker and all of the markers are disposed in mutual parallelism. An adjustable portable reference line having a fixed base portion adapted to be removably disposed on the reference markers in a predetermined attitude and a movable, or rotatable top portion including an elongated reference line indicia, is utilized in co-operation with a device adapted to engage the vehicle at a predetermined attitude with respect to the longitudinal axis, or center line of the vehicle. The reference indicia on the portable reference line is then adjusted into parallelism with the longitudinal axis of the vehicle and the portable reference line is subsequently moved from work station to work station whereat it is disposed on the reference markers and the reference line indicia may be used with suitable gauges or the like, to determine the attitude of the axis of rotation of the wheels of the vehicle.

---

This invention relates generally to a method and apparatus for aligning the wheels of a vehicle and is more particularly directed to a method and apparatus for adjusting the toe-in of the steerable wheels on a vehicle with respect to the steering wheel therefor and with respect to the non-steerable wheels on a vehicle.

The prior art with which my invention is concerned is replete with examples of apparatus and devices for aligning and adjusting the toe-in of the steerable wheels of a vehicle. The majority of such prior art devices have been comprised of mechanical and/or optical measuring apparatus of such a complicated nature that it has been difficult to operate, inaccurate and which does not take into account the necessary relationship that must be established between the non-steerable and steerable wheels of a vehicle for tracking and the positioning of the steering wheel for the steerable wheels so that it is centered after the steerable wheels have been adjusted to a predetermined toe-in as required by the geometry of a vehicle. In the prior art systems which utilized complicated mechanical linkages mounted on and disposed intermediate the steerable wheels of a vehicle, measurement and adjustment of toe-in has been based primarily on a reference line disposed on the rim or on the outer periphery of the tire on the wheel and, as such, has resulted in highly inaccurate adjustments. Other forms embodying optical sighting and projection of light beams have proven complicated in operation and require accurate alignment of the center line of a vehicle or complicated interpolation of graphic charts and the like so that, while accuracy may have been improved, expensive and complicated equipment has been required.

It is an object of my invention to provide improved apparatus for aligning the wheels of a vehicle.

It is a further object of my invention to provide an improved method of aligning the wheels of a vehicle.

It is a still further object of my invention to provide a portable reference line for use in combination with wheel alignment apparatus.

Another object of my invention is to provide a novel, portable, adjustable reference marker to be used in combination with wheel alignment apparatus.

A still further object of my invention is to provide wheel alignment apparatus for adjusting the steerable wheels of a vehicle with respect to toe-in which provide adjustment of the steerable wheels with respect to the stationary wheels on a vehicle and centers the steering wheel on such vehicle.

A still further object of my invention is to provide an improved method of adjusting the toe-in of the steerable wheels on a vehicle and the steering wheel therefor with respect to the stationary wheels on such vehicle.

A further object of my invention is to provide wheel alignment apparatus for adjusting the toe-in of the steerable wheels on a vehicle which is uncomplicated in operation, accurate and inexpensive to manufacture and use.

Another object of my invention is to provide an improved method of aligning the steerable wheels on a vehicle with respect to toe-in, steering wheel position and the plane of rotation of the stationary wheels on such vehicle which is accurate, uncomplicated and may be practiced with inexpensive apparatus.

With these and other objects in view, my invention is comprised of a work area including a supporting surface which is adapted to support a wheeled vehicle in a substantially horizontal attitude and having a work station adjacent each of the wheels of such a vehicle when disposed on the supporting surface.

A reference marker is disposed at each of the work stations adjacent each of the wheels of the vehicle. Each of the reference markers are stationarily mounted in co-parallelism. A portable adjustable means, including an adjustable reference line, is adapted to be disposed on the vehicle to establish a reference line related to the center line of the vehicle and the stationary markers. The portable reference line is also adapted to be attached to the steerable wheels of the vehicle to be used, in combination with the reference markers at the stations adjacent such steerable wheels and further means for establishing a predetermined relationship between the reference line and the plane of rotation of the steerable wheels whereby any necessary adjustment to provide the correct toe-in attitude of such steerable wheels may be readily effected.

These and other objects of my invention may become apparent from a consideration of the appended specification, claims and drawing in which FIG. 1 is a perspective view of a wheel alignment rack that may be used in practicing the principles of my invention;

FIG. 2 is a top plan view of the rack shown in FIG. 1 with selected portions of a typical vehicle disposed thereon;

FIG. 3 is a front elevation view of a portion of FIG. 2;

FIG. 4 is a top plan view of an adjustable portable reference device used in one embodiment of my invention;

FIG. 5 is a sectional view of FIG. 4 taken along section line 5—5;

FIG. 6 is a sectional view of FIG. 5 taken along section line 6—6;

FIG. 7 is a top plan view of a reference marker;

FIG. 8 is a sectional view of a portable adjustable line shown disposed on a reference marker and taken along section line 8—8 on FIG. 5;

FIG. 9 is a representation of a wheel alignment gauge that may be used in carrying out the principles of my invention;

FIG. 10 is a top plan view illustrating the relationship of the several elements of one embodiment of my invention;

FIG. 11 is a top plan view showing the relationship of the several elements of a further embodiment of my invention;

FIG. 12 is a perspective view of the wheel of a vehicle illustrating the relationship of several elements of both embodiments of my invention;

Figure 13:
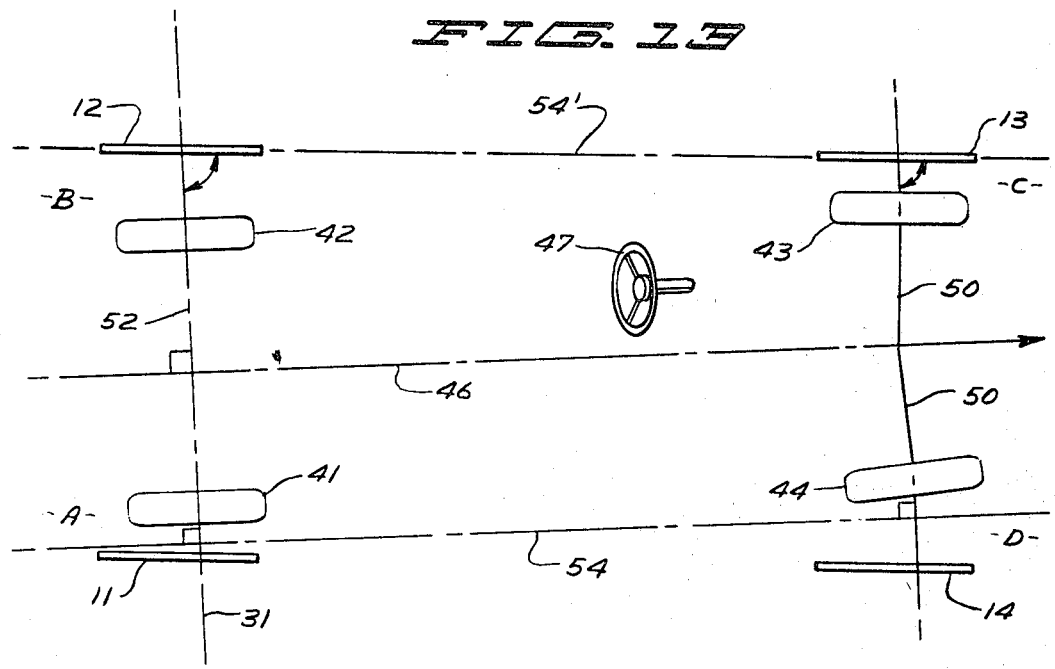
FIG. 13 is a partly schematic, composite, top plan view illustrating the operation of the two embodiments of my invention.

With reference to the drawings, my invention may be seen to comprise a generally horizontally disposed supporting surface 15 upon which are designated work stations A, B, C and D at appropriate locations corresponding to the locations of the wheels on a vehicle. Each of these stations is provided with a stationarily mounted reference marker 11, 12, 13 and 14. The reference markers are disposed in parallelism but not necessarily parallel to the center line of the supporting surface 15 nor, as will become apparent below, parallel to the center line of a vehicle upon which an alignment procedure is to be performed. A portable adjustable gauge 30 is adapted to be attached to the wheels of the vehicle in a predetermined relationship therewith and is used to establish a reference line 54 which, has a predetermined relationship with the center line of the automobile with respect to reference markers 11, 12, 13 and 14 at work stations A, B, C and D respectively. Gauge 30 is also used in performing the wheel alignment procedure as it is transported from work station to work station and/or wheel to wheel on the vehicle.

Referring to FIG. 1 of the drawings, there is shown a supporting surface 15 upon which is disposed a representation of a commercially available wheel support rack 10 that is adapted to receive a wheeled vehicle and to support the same in a generally horizontal attitude substantially parallel to support surface 15. Rack 10 is shown provided at its rear end with a pair of adjustable ramps that may be actuated, by a jack therefor, between inclined and level positions so as to allow a vehicle to be driven on to the rack. The forward end of the rack is customarily provided with a pair of turntables to be positioned under each of the steerable wheels of a vehicle so as to facilitate any necessary adjustments of the steerable wheels of a vehicle during the wheel alignment procedure. It should be noted that substantially any form of rack or support surface may be utilized in carrying out the principles of my invention and the illustrated embodiment is shown by way of example only.

In FIG. 2 of the drawings a top plan view of rack 10 is shown having the portions of an automobile with which wheel alignment procedures are concerned, disposed thereon. The vehicle is shown having a pair of stationary, or non-steerable, wheels 41 and 42 interconnected by a rear axle and differential 45 shown in dotted outline and having coaxially disposed axes of rotation represented by center line 52 of the rear axle of the vehicle. The vehicle also has a pair of adjustable steerable wheels 43 and 44 which are shown as having axes of rotation 50 which are not coaxial to illustrate the normal toe-in of the steerable wheels on the vehicle. The vehicle also has a center line 46 that is perpendicular to center line 52 of the rear axle. A representation of a steering wheel for the steerable wheels of the vehicle is shown indicated by reference character 47 as being in the "squared" or normal straightahead position. Wheels 41, 42, 43 and 44 are shown disposed adjacent work stations A, B, C and D respectively. At work station A wheel 41 is shown having a gauge 30 attached thereto and a portable adjustable reference 20 disposed thereunder in operative position. The remainder of the stations also show the gauge 30 and adjustable portable reference line 20 in dotted outline and superimposed over stationary reference markers 12, 13 and 14 respectively.

In FIG. 3 a front elevational view of work station C shows a steerable wheel 43 disposed on the turntable on rack 10 that is in turn supported on supporting surface 15. Wheel 43 is shown having a hub 51 to which gauge 30 is attached by suitable coupling means indicated by reference character 32. The center line of the axis of rotation of wheel 43 is indicated by reference character 50. A portion of a representative front suspension system of a vehicle is shown indicated by 48 and an axle for wheel 43 is shown indicated by reference character 49. Reference marker 13 is shown disposed on and attached to support surface 15 and disposed thereover in operative relationship is an adjustable portable reference as indicated generally by reference character 20.

In FIGS. 4, 5, 6 and 8 portable reference 20 is shown having a base member 21 that has a plurality of downwardly opening parallel grooves that are dimensioned to be slidably disposed reference markers 13. An aperture 23 is disposed in the approximate midpoint of base member 21 and is preferably provided with a screw threaded periphery. A carrying handle 24 is also disposed and suitably fastened to the top of base member 21. An adjustable member 25, having a plurality of parallel grooves or lines on its upper surface, is shown having an aperture 27 substantially at its midpoint. Adjustable member 25 is rotatably disposed on the top of base member 21 and is shown held in place by suitable screw 28 whereby it may be seen that adjustable member 25 is rotatable about a substantially vertical axis which is referred to in the remainder of the drawings as axis 38.

In FIGS. 7 and 8, one form of stationary reference marker is shown as an elongated bar having a lateral dimension substantially that of the grooves 22 in the bottom of base member 21 on portable adjustable reference line 20 and a pair of apertures 16 and 71 having enlarged top portions for receiving a like pair of screw members 18 and 19 that may be inserted into suitable receptacles therefor in supporting surface 15. It will be noted that it will be convenient to provide screw members 18 and 19 with a smaller diameter than holes 16 and 17 to allow for final adjustment of the stationary reference markers to the required parallelism. At this point it may also be noted that the parallelism of the stationary reference markers need not be related to the center line of rack 10 or any other reference line but merely to each other.

In FIG. 9 a representation of a gauge that may be used in practicing my invention is indicated generally by reference character 30. The general type of gauge described in United States Patent No. 3,171,208, issued Mar. 2, 1965, on an application filed June 29, 1961, in the name of B. Bender for "Measuring Instrument," has been observed to provide satisfactory operation in performing a wheel alignment procedure, as illustrated in FIG. 10, the top half of FIG. 13, FIG. 14 and FIGS. 2 and 3. A modification of that gauge may be utilized in connection with FIGS. 11, 12 and the lower half of FIG. 13 and in connection with this, the gauge shown in FIG. 9 is shown in a form that may be utilized for either of the two illustrated embodiments. In FIG. 9 gauge 30 is shown having a center line 31, a level guide means 34, a reference line 37 that is adjustable about a vertical axis 38 through adjusting means 39, a magnetic face 32 and a scale 35 that is adapted to provide an indication of the relative angular relationship between center line 31 with the plane of magnetic face 32. Magnetic face 32 is adapted to coact with, for example, a hub face 53 on wheel 42 which has an axis of rotation indicated by center line 52 which corresponds with, for example, the center line of the rear axles of a vehicle as indicated by reference numeral 52 on FIG. 2 of the drawings.

As may be noted from a consideration of the above-noted Bender Patent No. 3,171,208 the body of gauge 30, and its longitudinal center line 31 may be adjusted with respect to its angular relationship with face 32 to provide for suitable calibration so as to effect an adjustment of the wheels of a vehicle for alignment purposes where it is assumed, as explained in the above-noted patent, that the face of hub 53 of a wheel is perpendicular to its axis of rotation and, as has been observed, represents the most accurate surface or reference that is available for alignment purposes on the mounted wheel of a vehicle.

In the embodiment of my apparatus shown in FIG. 10 of the drawings, the adjustable optical reference line 37 shown in FIG. 9 is disposed so as to be perpendicular to center line 31 of gauge 30 while in the embodiment of FIG. 11, adjustable reference line 37 is physically rotated about vertical axis 38 in a manner to be described below but, in either event, a portable reference line, indicated by the reference characters 54 and 54′, on FIG. 12, is generated and may be used in performing the alignment procedure on a vehicle. Level means 34 is provided to enhance the accuracy of readings and/or adjustments that are made utilizing gauge 30 and it is preferable to level the top face of gauge 30 before a reading or adjustment procedure is performed.

Figure 14:
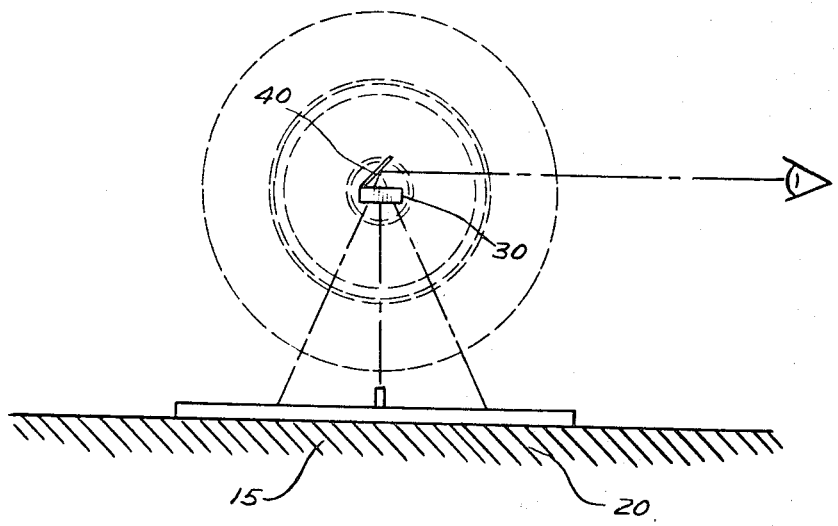
FIG. 14 is a side elevation view illustrating the relationship of the several elements of one embodiment of my invention.

In FIGS. 10 and 12 the establishment of a portable reference line 54 through the use of the apparatus shown in FIGS. 2, 3, 4, 5, 6, 7, 8, 9, 12 and 14 is shown. In this embodiment a reference element 33 (FIG. 10) is disposed on the body of gauge 30 in an attitude perpendicular to its longitudinal center line 31. If the apparatus of FIG. 9 were to be used in this embodiment, reference line 37 would be adjusted about vertical axis 38 so that it, too, was perpendicular to center line 31 of gauge 30. A portable reference line, indicated by reference character 54, is established by conforming the attitude of top adjustable member 25 on portable reference 20 to parallelism with reference element 33 (FIG. 10) by rotating top adjustable member 25 about its vertical axis 38 while maintaining the base member 21 on portable reference 20 is maintained stationary on reference marker 13. In FIGS. 10 and 12 it should be noted that reference line 54 establishes a reference that has a predetermined relationship with reference marker 13 and center line 46 on the vehicle, the wheels of which are to be aligned. In FIG. 14, a mirror 40 disposed at a 45 degree angle to the top surface of gauge 30 is illustrated as a means to facilitate viewing of reference line 33, or an optical prism or the like, to provide an easy adjustment of top adjustable member 25 on portable reference 20 by the operator. As will be explained in greater detail below, the initial calibration of top member 25 on portable reference 20 to establish a reference line 54 related to center line 46 on the vehicle and the plurality of reference markers at the different work stations provides a portable reference line that may be used at each of the stations and which relates any subsequent measurements or adjustments to the center line of the vehicle.

Referring to FIGS. 9, 11, 12 and 13, a second embodiment of my invention is shown in which gauge 30 utilizes the adjustability of reference line indicator 37 about vertical axis 38 to establish, as shown on FIG. 12, a portable reference line 54′ that is likewise possessed of a predetermined relationship between center line 46 of the vehicle and the several reference markers disposed in parallelism at each of the above-noted work stations on supporting surface 15 in proximity to the wheels of a vehicle. In the second embodiment, the adjustable reference line 37 is initially adjusted by disposing gauge 30 in relationship to the vehicle so that its longitudinal center line 31 is perpendicular to the center line 46 of the vehicle and line 37 is adjusted by rotating it about vertical axis 38 into parallelism with one of the several stationary reference markers disposed at each of the work stations. This, thus, establishes a predetermined relationship between center line 46 of the vehicle and each of the reference markers. It may be added at this point, and as shown in FIG. 12, that the parallel reference markers may be disposed above, instead of below, the axes of the wheels of the vehicle and a diagrammatic representation of a series of parallel disposed wires, or the like, indicated by reference character 55, is shown on FIG. 12. In the event that the stationary markers are disposed above the axes of the wheels to be aligned, the apparatus shown in FIG. 14 would be reversed and the optical line of sight would be toward the space above the axes of the wheels. However, the operation would be the same as far as performing the adjustment and measurements that may be desired.

OPERATION

The method of aligning the illustrated steerable wheels of a vehicle may be practiced through the use of either of the two disclosed embodiments or other apparatus that may occur to those skilled in the art upon becoming acquainted with the principles of my invention. The method comprises disposing a vehicle on a supporting surface, such as surface 15 or rack 10, without regard for the disposition of its center line or the axes of rotation of its wheels, establishing a reference line, 54 or 54′, that is related to the center line of the vehicle and one of a plurality of parallelly disposed reference markers, 11, 12, 13 and 14 at work stations, A, B, C and D, transporting the reference line related to the stationary markers and the center line of a vehicle to work stations at which measurement or adjustment functions are to be performed and utilizing the relation of the reference line with the reference marker at that particular work station to establish the relationship of the axis of rotation and/or the plane of rotation of the wheel to be adjusted or measured, at that work station using the transported, or portable reference line 54 or 54′ that is related to the center line 46 of a vehicle and the parallelly disposed stationary reference markers, 11, 12, 13 and 14. Under observed operating conditions, it has been convenient to establish the reference line 54, 54′ with relation to the axis of rotation, 52, of a stationary mounted wheel on a vehicle which is ordinarily constructed to lie perpendicular to the center line, 46, of a vehicle. In one such embodiment, the rear wheel of an average automobile was utilized to establish the portable reference line 54, 54′ and the adjustments or measurements of the front, steerable wheels of the vehicle were made relative to center line 46 rather than with respect of one steerable wheel to another. It should also be noted that prior to any adjustment of the steerable wheels, the steering wheel is first centered so that upon adjustment of the steerable wheels according to the specifications for the particular manufacture of car for toe-in the tracking of the steerable wheels with respect to the stationarily mounted wheels is accurate and the steering wheel is in its intended and proper center position when the vehicle is traveling in a straight line. Following adjustment of the steerable wheels, the calibration of the entire wheel support system for the vehicle may be checked by noting parallelism or deviation from parallelism when the portable reference line 54 or 54′ is applied to the other stationary wheel and compared to the reference marker at the work station thereof.

In the operation of the embodiment of my invention shown in FIGS. 2, 3, 4, 5, 6, 8, 9, 10, 12, the upper portion of FIG. 13 and FIG. 14, a portable reference line 54 is established at either work station A or B by suitably attaching gauge 30 with its center line coaxially of center line 52 of rear axle 45 on the illustrated representation of a vehicle. This may conveniently be accomplished by magnetically attaching the gauge to a machined surface attached to the hub of one of the stationarily mounted wheels of a vehicle and thereafter leveling the upper face of the gauge to a predetermined attitude, in the illustrative embodiment, a horizontal position. In the present embodiment, an optical reference line 33 (FIG. 10) is shown disposed perpendicular to center line 31 of gauge 30 and is therefore parallel to center line 46 of the vehicle. The portable adjustable reference device 20 is disposed on one of the stationary reference markers (13) and the top adjustable member 25 thereof is optically aligned with optical reference line 33 on gauge 30. It may be noted that the alignment procedure may also involve light projecting apparatus and the like. Having adjusted top adjustable member 25 on portable adjustable reference 20 to parallelism with optical reference line 33 on gauge 30, a portable reference line 54 is established which, when transported to the various other work stations and disposed on the parallelly disposed reference markers at each of the stations, remains parallel to the center line 46 of the vehicle.

Following the establishment of reference line 54, which may be any of the parallelly disposed grooves 26 on portable adjustable reference 20, portable reference 20 is moved to a work station, for example work station C, adjacent one of the steerable wheels of a vehicle. Gauge 30 is also transported to the wheel and is again magnetically attached to the hub of the wheel which, for purposes of explanation, is assumed to be a machined surface that is perpendicular to the center line 50 of axle 49 that rotatably supports wheel 43. For purposes of illustration, the non-parallel faces described in the above-noted Bender patent, No. 3,171,208 may be utilized to provide an offset from the previous perpendicular relationship between longitudinal axis 31 of gauge 30 and mounting face 32 thereof. This may be done by rotating the wheel engaging end of gauge 30 and utilizing the index and scale calibrations to set in a predetermined angle which, when translated, or transferred to axle 49 by suitable adjustment of the steering rigging of the vehicle will provide the necessary toe-in adjustment. The adjustment itself is made by re-aligning optical reference line 33 with portable reference line 54 (one of grooves 26 on portable adjustable reference 20) by adjusting the tie rods of the steering rigging after gauge 30 has been adjusted to the predetermined attitude as determined by level means 34 disposed thereon. As explained in connection with the method of operation above, it is, of course, desirable to initially center and clamp the steering wheel of the vehicle before the adjustment procedure is carried out. It should also be noted that for the convenience of an operator, an arrow is provided at the forward end of portable adjustable reference 20 and throughout the performance of adjustment or measurement at the several work stations, the arrow is intended to be oriented in the same direction with respect to the vehicle. Thus, with reference to the perspective view of FIG. 12, it may be seen that reference line 54 emanating from portable adjustable reference 20 is provided so as to be oriented in parallelism with center line 46 of the vehicle by virtue of the perpendicular relationship of wheel axis 52 and optical reference line 33 and the adjustment of top adjustable member 25 on portable adjustable reference 20 to parallelism with optical reference line 33 provides the reference line 54 that is related to each of the stationary reference markers at the several work stations and to center line 46 on the vehicle so that when portable reference 20 is disposed on any of the stationary reference markers, it may be used in adjustment or measurement procedures.

In the second embodiment of my invention, a portable reference line 54' is established to have a predetermined relationship with center line 46 on the vehicle by aligning adjustable optical reference line 37 on gauge 30 with a stationary reference marker. Referring to FIGS. 9, 11, and the upper portion of FIG. 13, gauge 30 is adjusted so that its magnetic face 32 is perpendicular to its longitudinal center lines 31 and attached to a surface on a wheel that is perpendicular to its axis of rotation. Adjustable optical reference line 37 is then rotated about vertical axis 38 until it is parallel with the stationary reference marker disposed immediately below gauge 30 as it is mounted on the vehicle. This, then, provides a portable reference line 54' which, when aligned with the stationary reference marker at the several work stations, establishes the same predetermined relationship as is obtained in the first described embodiment with center line 46 of the vehicle and the several stationary reference markers. The manner of obtaining a desired predetermined relationship of the wheels of the vehicle with respect to its center line may again be accomplished through the use of providing an offsetting adjustment, suitably calibrated, to effect a predetermined angular relationship between the longitudinal center line 31 of gauge 30 and its mounting face 32. Adjustment of the supporting means for a particular wheel until such time as the adjustable optical reference line 37, representing portable reference line 54', attains parallelism with the stationary reference marker disposed at the particular work station, results in proper alignment of that particular wheel with regard to the center line of the vehicle.

What is claimed is:

1. Wheel alignment apparatus comprising in combination:
    (a) a support for a wheeled vehicle, said vehicle having a longitudinal center line axis and said support having work stations adjacent each wheel of a vehicle to be disposed thereon;
    (b) reference markers at each of said work stations, said reference markers being disposed in parallelism with each other;
    (c) portable means, including a first member having a stationary reference line and adapted to engage a vehicle at a predetermined attitude with respect to the center line thereof and a second member, including a stationary portion adapted to be removably disposed on the support for the vehicle in a predetermined relationship with the reference markers and a further portion rotatably disposed on said fixed portion and having at least one longitudinally extending indicia.

2. The apparatus of claim 1 in which the first member of the portable means includes means for engaging the wheels of the vehicle at a predetermined attitude with respect to the axis of rotation of said wheels.

3. The apparatus of claim 2 in which the first member of the portable means includes means for adjustably engaging a wheel on the vehicle.

4. The apparatus of claim 1 in which the fixed portion of the second member includes at least one longitudinally extending downwardly opening groove and the reference markers are comprised of complementary dimensioned upwardly extending bar members.

5. Apparatus for aligning the steerable wheels of a vehicle comprising in combination; vehicle supporting means including wheel supporting areas adapted to receive the wheels of a vehicle; stationary reference markers adjacent each of said wheel supporting areas, said stationary reference markers being disposed in mutual parallelism; a portable adjustable reference member having a bottom portion adapted to be removably disposed on said stationary reference markers and a top portion including at least one longitudinally elongated reference line indicia adjustably mounted for rotation about an axis perpendicular to the plane of said bottom member; and at least one wheel supported gauge adapted to be removably disposed on a vehicle and including means for providing a reference line parallel to the center line of a vehicle.

6. Apparatus for establishing a portable reference line that is parallel to the longitudinal axis of a vehicle, the wheels of which are to be aligned with respect thereto, comprising:
    (a) a vehicle support;

(b) a plurality of work stations, each including at least one reference marker disposed in mutual parallelism;

(c) portable means including a fixed base portion to be removably disposed on said reference markers and a further portion having a longitudinally elongated reference line indicia and being rotatably disposed on said base portion for angular adjustment about an axis perpendicular to the longitudinal axis of said base portion; and (d) means engaging the vehicle for comparing the attitude of the reference line indicia on the further portion of said portable means with the longitudinal axis of a vehicle.

7. Wheel alignment apparatus comprising in combination:

(a) vehicle supporting means adapted to receive a wheeled vehicle, said vehicle having a longitudinal axis, said supporting means including a plurality of work stations;

(b) reference markers disposed in mutual parallelism at each of said work stations;

(c) adjustable reference line means including a fixed portion for removably engaging said reference markers and a movable portion including a reference line indicia adapted to be disposed in alignment with the longitudinal axis of a vehicle; and (d) means operable to engage the vehicle to align the reference indicia on the movable portion of said adjustable reference line means with the longitudinal axis of a vehicle.

8. The apparatus of claim 7 in which the reference markers are disposed on the vehicle supporting means.

9. The apparatus of claim 7 in which the reference markers are disposed above the vehicle supporting means.

References Cited

UNITED STATES PATENTS

| | | | |
|---|---|---|---|
| Re. 21,052 | 4/1939 | Haucke | 33—203.15 |
| 2,410,339 | 10/1946 | Creagmile | 33—46.2 |
| 2,910,775 | 11/1959 | Müller et al. | 33—46.2 |
| 3,023,511 | 3/1962 | Castiglia | 33—203.15 |
| 3,171,208 | 3/1965 | Bender | 88—14 |

WILLIAM D. MARTIN, JR., *Primary Examiner.*